United States Patent
Mimura et al.

(10) Patent No.: US 11,657,777 B2
(45) Date of Patent: May 23, 2023

(54) CONTROL METHOD FOR DISPLAY DEVICE AND DISPLAY DEVICE

(71) Applicant: SEIKO EPSON CORPORATION, Tokyo (JP)

(72) Inventors: Nona Mimura, Matsumoto (JP); Mitsunori Tomono, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/412,488

(22) Filed: Aug. 26, 2021

(65) Prior Publication Data

US 2022/0068235 A1 Mar. 3, 2022

(30) Foreign Application Priority Data

Aug. 27, 2020 (JP) .............................. JP2020-143318

(51) Int. Cl.
G09G 5/00 (2006.01)
G09G 3/00 (2006.01)

(52) U.S. Cl.
CPC ............. G09G 5/006 (2013.01); G09G 3/001 (2013.01); G09G 2320/08 (2013.01)

(58) Field of Classification Search
CPC .... G09G 5/006; G09G 3/001; G09G 2320/08; G06F 9/445; H04N 2201/3256; H04N 2201/3257; H04N 2201/326; H04N 2201/3274; H04N 2201/3276
See application file for complete search history.

(56) References Cited

U.S. PATENT DOCUMENTS

| 6,414,659 | B1 | 7/2002 | Park et al. |
| 10,855,952 | B1* | 12/2020 | Rocklin .............. H04L 65/1089 |
| 2003/0098874 | A1 | 5/2003 | Tobiya |
| 2009/0073101 | A1* | 3/2009 | Herz ......................... G06F 3/14 345/98 |
| 2015/0261284 | A1* | 9/2015 | Lee ........................ G06F 1/3234 713/323 |
| 2015/0346987 | A1* | 12/2015 | Ren ....................... G09G 3/3406 345/589 |
| 2020/0183470 | A1* | 6/2020 | Lee .......................... G06F 9/445 |

FOREIGN PATENT DOCUMENTS

| JP | 2001-13931 | A | 1/2001 |
| JP | 2003-162270 | A | 6/2003 |
| JP | 2007-282077 | A | 10/2007 |
| JP | 2008-145754 | A | 6/2008 |
| JP | 2015-154345 | A | 8/2015 |

\* cited by examiner

*Primary Examiner* — Antonio A Caschera
(74) *Attorney, Agent, or Firm* — Oliff PLC (57) ABSTRACT

A control method for a display device including a display unit, a first control unit, and a second control unit, the control method comprising: holding a plurality of display setting data relating to a display state of an image by the display unit in such a way that the plurality of display setting data are available for use by the first control unit, causing the first control unit to execute display control to cause the display unit to display an image based on display data, causing the second control unit to execute an application program and output the display data, and causing the first control unit to set an one of the plurality of display setting data corresponding to the application program in response to the second control unit starting up the application program.

8 Claims, 5 Drawing Sheets

CONTROL METHOD FOR DISPLAY DEVICE AND DISPLAY DEVICE

The present application is based on, and claims priority from JP Application Serial Number 2020-143318, filed Aug. 27, 2020, the disclosure of which is hereby incorporated by reference herein in its entirety.

BACKGROUND

1. Technical Field

The present disclosure relates to a control method for a display device, and a display device.

2. Related Art

According to the related art, a device configured to display a video and having a function of changing a setting for image quality is known, for example, as described in JP-A-2007-282077. A broadcast receiving device described in JP-A-2007-282077 identifies the genre of a broadcast program to be received, based on EPG information, and acquires an image quality parameter and a sound quality parameter, based on the identified genre. This device applies the acquired image quality parameter and sound quality parameter to video processing and audio processing and then displays a video and outputs a sound.

The device described in JP-A-2007-282077 has integrated therein the function of identifying the genre of a broadcast program and the function of displaying a video to which the image quality parameter is applied. In contrast, in a device configured to display a video inputted via an interface, processing to analyze an input video needs to be performed in order to change the display setting according to the input video. For example, in a device configured to display a video outputted by an application program, when the application program that is currently being executed is changed, the state of the video needs to be analyzed in order to change the display setting according to the state of the video. In this case, the display setting is not suitable for the video until its change is completed. Therefore, there is concern over a temporary drop in display quality.

SUMMARY

An aspect of the present disclosure is directed to a control method for a display device including a display unit, a first control unit, and a second control unit. The control method includes: holding a plurality of display setting data relating to a display state of an image by the display unit in such a way that the plurality of display setting data are available for use by the first control unit; causing the first control unit to execute display control to cause the display unit to display an image based on display data; causing the second control unit to execute an application program and output the display data; and causing the first control unit to set the display setting data corresponding to the application program in response to the second control unit starting up the application program.

Another aspect of the present disclosure is directed to a display device including: a display unit; a first control unit causing the display unit to display an image based on display data; and a second control unit executing an application program and outputting the display data. The first control unit has a plurality of display setting data relating to a display state of the image. The first control unit sets the display setting data corresponding to the application program in response to the second control unit starting up the application program.

DESCRIPTION OF EXEMPLARY EMBODIMENTS

1. First Embodiment 1-1. Overall Configuration of Projector

A first embodiment of the present disclosure will now be described with reference to the drawings.

Figure 1:
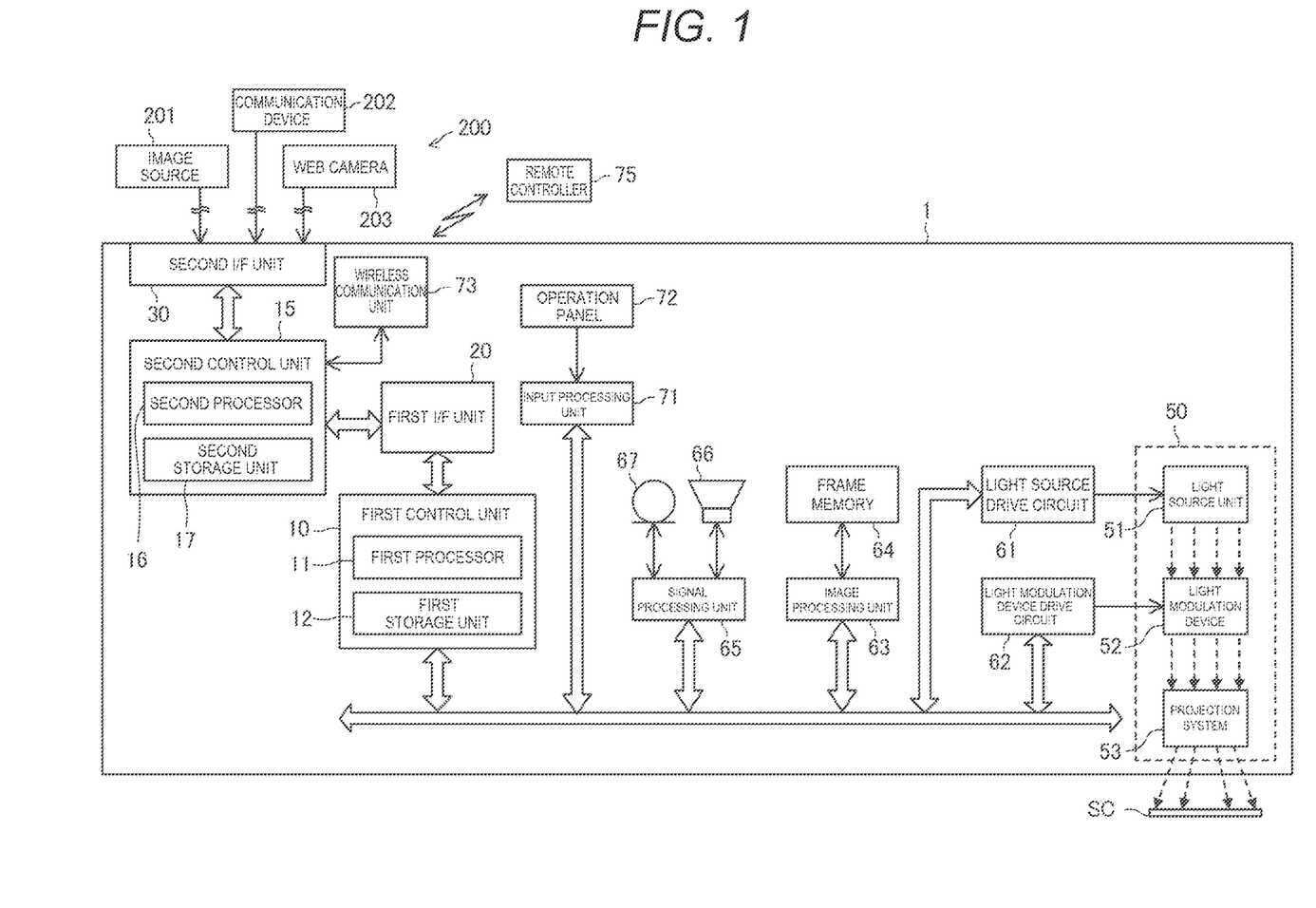
FIG. 1 is a block diagram of a projector.

FIG. 1 is a block diagram showing the configuration of a projector 1. The projector 1 is equivalent to an example of the display device.

The projector 1 has a first control unit 10 controlling each part of the projector 1, and a projection unit 50. The projector 1 forms an optical image and projects the image onto a screen SC, by the projection unit 50. The projector 1 is equivalent to an example of the display device. The operation of the projector 1 forming a projection image on the screen SC is equivalent to a display. The projection unit 50 is equivalent to an example of the display unit.

The image displayed by the projector 1 is not limited to a still image but also includes a dynamic image, that is, a video. Image data processed by the projector 1 includes still image data and video data.

The screen SC may be a curtain-like screen. Also, a wall surface of a building or a flat surface of an installed object may be used as the screen SC. The screen SC is not limited to a flat surface and may be a curved surface or a concave or convex surface.

The projection unit 50 has a light source unit 51, a light modulation device 52, and a projection system 53. The projection unit 50 is equivalent to an example of the display unit. A light source drive circuit 61 and a light modulation device drive circuit 62 which operate under the control of the first control unit 10 are coupled to the projection unit 50.

The projector 1 has an image processing unit 63 processing an image, and a frame memory 64.

The light source unit 51 has a lamp such as a halogen lamp, a xenon lamp or an ultra-high-pressure mercury lamp, or a solid-state light source such as an LED (light-emitting diode) or a laser light source. The light source unit 51 may also have a reflector and an auxiliary reflector for guiding light emitted from the light source to the light modulation device 52. The light source unit 51 may also have a lens group for improving optical characteristics of projection light, a polarizer, or a dimmer element or the like for reducing the amount of light of the light emitted from the light source, on the path to the light modulation device 52. The light source drive circuit 61 turns on and off the light source of the light source unit 51 under the control of the first control unit 10.

The light modulation device 52 has a light modulation element. The light modulation device 52 modulates the light emitted from the light source unit 51 and thus generates image light. The light modulation device 52 has, for example, three liquid crystal panels corresponding to the primary colors of R, G, and B, as the light modulation element. The liquid crystal panel may be a transmission-type liquid crystal panel or a reflection-type liquid crystal panel. The light emitted from the light source unit 51 is split, for example, into three color lights of R, G, and B, which then are incident on the liquid crystal panels corresponding to the R, G, and B color lights and are modulated there. The image light is combined together by a light combining system such as a cross dichroic prism and exits to the projection system 53. The light modulation element provided in the light modulation device 52 is not particularly limited and may be, for example, a digital micromirror device.

The light modulation device 52 is driven by the light modulation device drive circuit 62. The light modulation device drive circuit 62 is coupled to the image processing unit 63, described later. To the light modulation device drive circuit 62, image data corresponding to the primary colors of R, G, and B is inputted from the image processing unit 63. The light modulation device drive circuit 62 converts the inputted image data into a signal suitable for the operation of the liquid crystal panels. The light modulation device drive circuit 62 applies a voltage to the liquid crystal panels of the light modulation device 52, based on the converted signal, and thus draws an image on the liquid crystal panels.

The projection system 53 has a lens, a mirror or the like for causing the incident image light to form an image on the screen SC. The projection system 53 may have a zoom mechanism for enlarging or reducing the image projected on the screen SC, and a focus adjustment mechanism for adjusting the focus.

To the image processing unit 63, image data of the image to be displayed on the screen SC is inputted under the control of the first control unit 10. The image processing unit 63 loads the inputted image data into the frame memory 64. The frame memory 64 has a plurality of banks. Each bank has a storage capacity in which image data for one frame can be written. The frame memory 64 is formed, for example, of an SDRAM (synchronous dynamic random-access memory).

The image processing unit 63 performs various kinds of image processing on the image data loaded in the frame memory 64, such as resolution conversion processing or resizing, correction of a distortion, shape correction processing, digital zoom processing, and image adjustment processing to adjust the color tone and luminance of the image.

The image processing unit 63 and the frame memory 64 can be formed, for example, of an integrated circuit. The integrated circuit includes an LSI, an ASIC (application-specific integrated circuit), and a PLD (programmable logic device). The PLD includes, for example, an FPGA (field-programmable gate array). Also, a part of the configuration of the integrated circuit may include an analog circuit. A combination of a processor and an integrated circuit may be employed. The combination of a processor and an integrated circuit is referred to as a microcontroller (MCU), an SoC (system on a chip), a system LSI, a chip set or the like.

The projector 1 has a signal processing unit 65 processing an audio signal. The signal processing unit 65 generates an analog audio signal based on audio data inputted from the first control unit 10, outputs the analog audio signal to a speaker 66, and thus causes the speaker 66 to output a sound or an audio. A microphone 67 is coupled to the signal processing unit 65. The signal processing unit 65 acquires an audio signal of a sound or an audio collected by the microphone 67, generates digital audio data, and outputs the digital audio data to the first control unit 10.

The projector 1 has an input processing unit 71. To the input processing unit 71, an operation panel 72 provided in the casing of the projector 1 is coupled. The operation panel 72 has various operators that can be operated by the user. The input processing unit 71 detects an operation on the operators of the operation panel 72 and outputs operation data representing the detected operation to the first control unit 10.

The input processing unit 71 may have, for example, an infrared receiving unit receiving an infrared signal and may detect an operation on an infrared remote controller, not illustrated.

The first control unit 10 has a first processor 11 and a first storage unit 12.

The first storage unit 12 is a storage device storing a program executed by the first processor 11 and data processed by the first processor 11. The first storage unit 12 is formed of a magnetic storage device, a semiconductor storage device such as a flash ROM (read-only memory), or a storage device of another type. The first storage unit 12 may be a volatile storage device such as a RAM (random-access memory) forming a work area for the first processor 11. The first storage unit 12 may be a non-volatile storage device such as a hard disk drive or an SSD (solid-state drive). The first storage unit 12 may also include both a volatile storage device and a non-volatile storage device. The first storage unit 12 is not limited to any specific configuration.

The first storage unit 12 stores a control program executed by the first processor 11 and various data processed by the first processor 11.

The first processor 11 may be formed of a single processor. Alternatively, a plurality processors may function as the first processor 11. The first processor 11 executes programs including a first operating system 111, described later, and thus controls each part of the projector 1.

To the first control unit 10, a second control unit 15 is coupled via a first interface unit 20. The first interface unit 20 is an interface coupling the first control unit 10 and the second control unit 15 together in such a way as to enable transmission and reception of various data such as image data, audio data, and control data.

The second control unit 15 has a second processor 16 and a second storage unit 17.

The second storage unit 17 is a storage device storing a program executed by the second processor 16 and data processed by the second processor 16. The second storage unit 17 is formed of a magnetic storage device, a semiconductor storage device such as a flash ROM, or a storage device of another type. The second storage unit 17 may be a volatile storage device such as a RAM forming a work area for the second processor 16. The second storage unit 17 may be a non-volatile storage device such as a hard disk drive or an SSD. The second storage unit 17 may also include both a volatile storage device and a non-volatile storage device. The second storage unit 17 is not limited to any specific configuration.

The second storage unit 17 stores a control program executed by the second processor 16 and various data processed by the second processor 16.

The second processor 16 may be formed of a single processor. Alternatively, a plurality processors may function as the second processor 16. The second processor 16 executes the output of image data and/or audio data to the first control unit 10 and the output of control data to the first control unit 10 by the function of a second operating system 151, described later.

The image data outputted from the second control unit 15 to the first interface unit 20 is equivalent to the display data according to the present disclosure.

The first control unit 10 causes the projection unit 50 to display an image, based on the image data inputted from the second control unit 15 via the first interface unit 20. The first control unit 10 also causes the speaker 66 to output a sound or an audio, based on the audio data inputted via the first interface unit 20.

A wireless communication unit 73 is coupled to the second control unit 15. The wireless communication unit 73 is a wireless communication device executing wireless communication, for example, conforming to a Bluetooth standard or a Wi-Fi standard. The wireless communication unit 73 executes wireless data communication with a remote controller 75 and detects an operation carried out on the remote controller 75 by the user. The wireless communication unit 73 generates operation data corresponding to the detected operation and outputs the operation data to the second control unit 15. The wireless communication unit 73 may be configured to execute short-range wireless communication utilizing NFC (Near-Field Communication) or may be configured in conformity with other communication standards.

Bluetooth is a registered trademark. Wi-Fi is a registered trademark.

The second control unit 15 is coupled to a second interface unit 30 provided in the projector 1. The second interface unit 30 has one or a plurality of interfaces coupled to a device external to the projector 1. For example, the second interface unit 30 has a connector and an interface circuit that conform to a standard such as HDMI, DisplayPort, HDBaseT, USB, Type-C, or 3G-SDI. HDMI is the abbreviation of High-Definition Multimedia Interface. SDI is the abbreviation of Serial Digital Interface.

The second interface unit 30 may have, for example, a connector and an interface circuit for data communication based on Ethernet, IEEE 1394, USB or the like. The second interface unit 30 may also have an RCA terminal and an analog video terminal such as a VGA terminal, an S terminal or a D terminal. The second interface unit 30 may also have a wireless communication device performing wireless communication conforming to a Bluetooth or Wi-Fi standard. HDMI is a registered trademark. Ethernet is a registered trademark.

The device that is external and coupled to the second interface unit 30 is referred to as an external device 200. In FIG. 1, an image source 201, a communication device 202, and a web camera 203 are illustrated as examples of the external device 200.

The image source 201 is a device outputting image data to the projector 1. The image source 201 is not limited to any specific configuration. The image source 201 may be any device that can be coupled to the projector 1 and can output image data to the projector 1. For example, the image source 201 may be a disk-type recording medium playback device, a television tuner device, a personal computer, or a document camera.

The communication device 202 is a device that performs data communication with a different device from the projector 1 and outputs data acquired by data communication to the second interface unit 30. For example, the communication device 202 may be a smartphone, a mobile phone, a tablet computer, a Wi-Fi router or the like.

The web camera 203 is a digital camera and outputs picked-up image data to the second interface unit 30. The web camera 203 may output dynamic image data to the second interface unit 30 or may periodically output still image data to the second interface unit 30.

1-2. Control System of Projector

Figure 2:
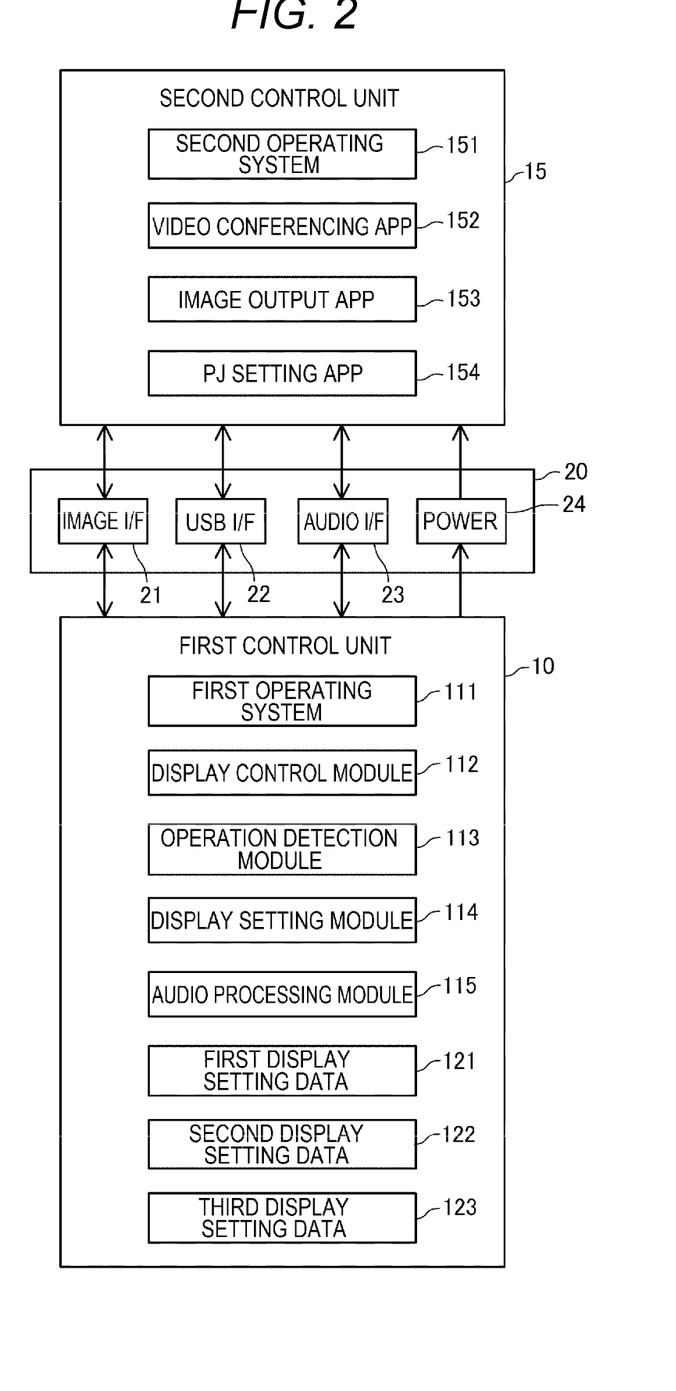
FIG. 2 is a block diagram of a control system of the projector.

FIG. 2 is a block diagram showing a control system of the projector 1 and shows functional blocks in the first control unit 10, the second control unit 15, and the first interface unit 20.

The first interface unit 20 has an interface for transmitting various data between the first control unit 10 and the second control unit 15, as described above. In FIG. 2, an image interface 21, a USB interface 22, and an audio interface 23 are illustrated as an example. The image interface 21 is, for example, an HDMI, DisplayPort, HDBaseT, USB, Type-C, 3G-SDI or similar interface. The audio interface 23 is, for example, an SPDIF interface. The USB interface 22 is an interface conforming to a USB standard and is not limited to any particular version of USB standard.

The first interface unit 20 has a power coupling unit 24. The power coupling unit 24 is a connector or a circuit supplying electric power to the second control unit 15 and may have a voltage converter circuit. The projector 1 supplies electric power to individual parts including the first control unit 10 from a power supply unit, not illustrated. The second control unit 15 operates on receiving the supply of electric power from the power supply unit, not illustrated, via the power coupling unit 24. The second control unit 15 may also be configured to be able to supply electric power to the interface circuit of the second interface unit 30 and to the wireless communication unit 73. Also, a configuration in which electric power is supplied from the power coupling unit 24 to a circuit board with the second processor 16, the second storage unit 17, the second interface unit 30, and the wireless communication unit 73 installed, may be employed. In this case, the first control unit 10, the second control unit 15, and the first interface unit 20 may be installed at different circuit boards from each other.

The first control unit 10 has a first operating system 111. The first operating system 111 is a program executed by the first processor 11 and has a basic control function to control each part of the projector 1. The first operating system 111 provides a platform for an application program. The first control unit 10 executes an application program for controlling the projector 1, on the first operating system 111. Specifically, the first control unit 10 causes a display control module 112, an operation detection module 113, a display setting module 114, and an audio processing module 115 to operate.

The first control unit 10 has display setting data including various set values relating to an operation of the projector 1. As an example of this, FIG. 2 shows first display setting data 121, second display setting data 122, and third display setting data 123. These display setting data are stored in the first storage unit 12.

The first display setting data 121, the second display setting data 122, and the third display setting data 123 include a set value that sets image processing to be executed by the image processing unit 63.

The image processing unit 63 executes various kinds of image processing as described above on image data inputted from the first control unit 10. The first control unit 10 sets a parameter of image processing for the image processing unit 63. For example, the first control unit 10 sets an input resolution and an output resolution to be used in resolution conversion processing. The first control unit 10 also sets, for example, an adjustment value for the color tone of the image and an adjustment value for the luminance, in the case of image adjustment processing. The first control unit 10 also designates a color mode when the image processing unit 63 can switch between color modes. The first control unit 10 also sets, for example, a filter for coordinate transformation in the case of shape correction processing. These specific parameters, set values, filter and the like are included in the first display setting data 121, the second display setting data 122, and the third display setting data 123.

Here, the switching between color modes refers to a function of the image processing unit 63 changing the color tone of a projection image projected on the screen SC. In this embodiment, an example where the image processing unit 63 is configured to be able to switch between a theater mode, a video conferencing mode, and a presentation mode, is described. The theater mode is a color mode suitable for displaying a video content such as a movie. In the theater mode, an image having a broad range of luminance and a subdued color tone is displayed on the screen SC. The video conferencing mode is a mode where an image having a narrower range of luminance than in the theater mode and a bright color tone is displayed on the screen SC.

The video conferencing mode may include, for example, processing to cause low-resolution image data picked up by the web camera 203 to match the display resolution of the light modulation device 52. For example, image data of a video content outputted from the image source 201 is 1080p image data of 1920×1080 dots, that is, so-called 4K-resolution image data. In the theater mode, image processing suitable for such high-resolution image data is executed. Image data picked up by a camera used for video conferencing, such as the web camera 203, has a lower resolution than image data processed in the theater mode. Therefore, in the video conferencing mode, image processing suitable for low-resolution image data is executed.

The presentation mode is a mode where high-resolution image data is displayed on the screen SC as an image having a bright color tone and a high contrast. In the presentation mode, image processing to increase the luminance of the color tone of the image and image processing to increase the contrast are executed.

In this embodiment, the first display setting data 121 corresponds to the theater mode. The second display setting data 122 corresponds to the video conferencing mode. The third display setting data 123 corresponds to the presentation mode.

The display control module 112 outputs image data to the image processing unit 63 and controls the projection unit 50, and thus causes the projection unit 50 to project an image onto the screen SC. For example, the display control module 112 acquires image data inputted via the first interface unit 20 and outputs the acquired image data to the image processing unit 63. The display control module 112 causes the image processing unit 63 to execute image processing. The display control module 112 drives the light source drive circuit 61 and the light modulation device drive circuit 62 and thus causes the projection unit 50 to execute projection.

The operation detection module 113 detects an operation on the projector 1, based on operation data inputted from the input processing unit 71 and operation data inputted from the USB interface 22.

The display setting module 114 configures a setting for the display of an image by the projection unit 50 and/or for the output of an audio by the speaker 66. Specifically, the display setting module 114 selects one of the first display setting data 121, the second display setting data 122, and the third display setting data 123, and sets the parameter and set value included in the selected display setting data for the image processing unit 63.

The display setting module 114 may select one of the first display setting data 121, the second display setting data 122, and the third display setting data 123, and configure a setting, based on the operation detected by the operation detection module 113.

In this embodiment, the display setting module 114 selects the second display setting data 122 corresponding to the video conferencing mode and configures a setting, in response to the second control unit 15 starting to execute a video conferencing app 152, described later. Also, in response to the video conferencing app 152 being ended, the display setting module 114 sets the display setting data used before the setting of the second display setting data 122, for the image processing unit 63.

The first display setting data 121, the second display setting data 122, and the third display setting data 123 may include a set value and a parameter for audio processing. In this case, for example, the first display setting data 121 includes, as the display setting data suitable for the theater mode, a parameter of acoustic processing that expands the dynamic range and includes a surround effect. The second display setting data 122 includes, as the display setting data suitable for the video conferencing mode, a parameter of acoustic processing that emphasizes the frequency band of human voice and attenuates the frequency band of ambient sound.

The audio processing module 115 outputs audio data inputted via the first interface unit 20 to the signal processing unit 65 and causes the speaker 66 to output a sound or an audio. Specifically, the audio processing module 115 processes audio data inputted with image data via the image interface 21 or audio data inputted via the audio interface 23. The audio processing module 115 may execute acoustic processing according to the display setting data set by the display setting module 114. In this case, the audio processing module 115 may output the acoustically processed audio to the signal processing unit 65. The audio processing module 115 may also set the display setting data set by the display setting module 114, for the signal processing unit 65, and cause the signal processing unit 65 to execute acoustic processing.

The second control unit 15 has a second operating system 151. The second operating system 151 is a program executed by the second processor 16 and has a basic control function to control the output of image data, audio data, control data and the like to the projector 1. The second operating system 151 also provides a platform for an application program. The second control unit 15 executes an application program on the second operating system 151. Specifically, the second control unit 15 causes a video conferencing app 152, an image output app 153, and a PJ setting app 154 to operate.

The video conferencing app 152 is an application program executing a video conference based on picked-up image data picked up by the web camera 203. As the second processor 16 executes the video conferencing app 152, the second control unit 15 outputs the picked-up image data from the web camera 203 to the first interface unit 20. When audio data is inputted to the second interface unit 30 from the web camera 203 or an audio device, not illustrated, the video conferencing app 152 outputs this audio data to the first interface unit 20.

The image output app 153 is an application program acquiring image data outputted from the image source 201 and outputting the image data to the first interface unit 20. When the image source 201 outputs audio data with image data, the image output app 153 may output this audio data to the first interface unit 20. The image output app 153 may also acquire image data outputted from the communication device 202 and output the image data to the first interface unit 20.

The PJ setting app 154 is an application program configuring a setting for a function of the projector 1 in response to an operation on the remote controller 75. In response to an operation on the remote controller 75, the PJ setting app 154 generates image data of a setting screen for setting a function of the projector 1 and outputs the image data to the first interface unit 20. In this case, the projection unit 50 displays the setting screen on the screen SC under the control of the first control unit 10. In response to an operation on the remote controller 75 during the display of the setting screen, the PJ setting app 154 generates control data for setting a function of the projector 1 and outputs the control data to the first interface unit 20. In this case, the first control unit 10 receives the control data and configures a setting for a function of the projector 1.

1-3. Operation of Projector

Figure 3:
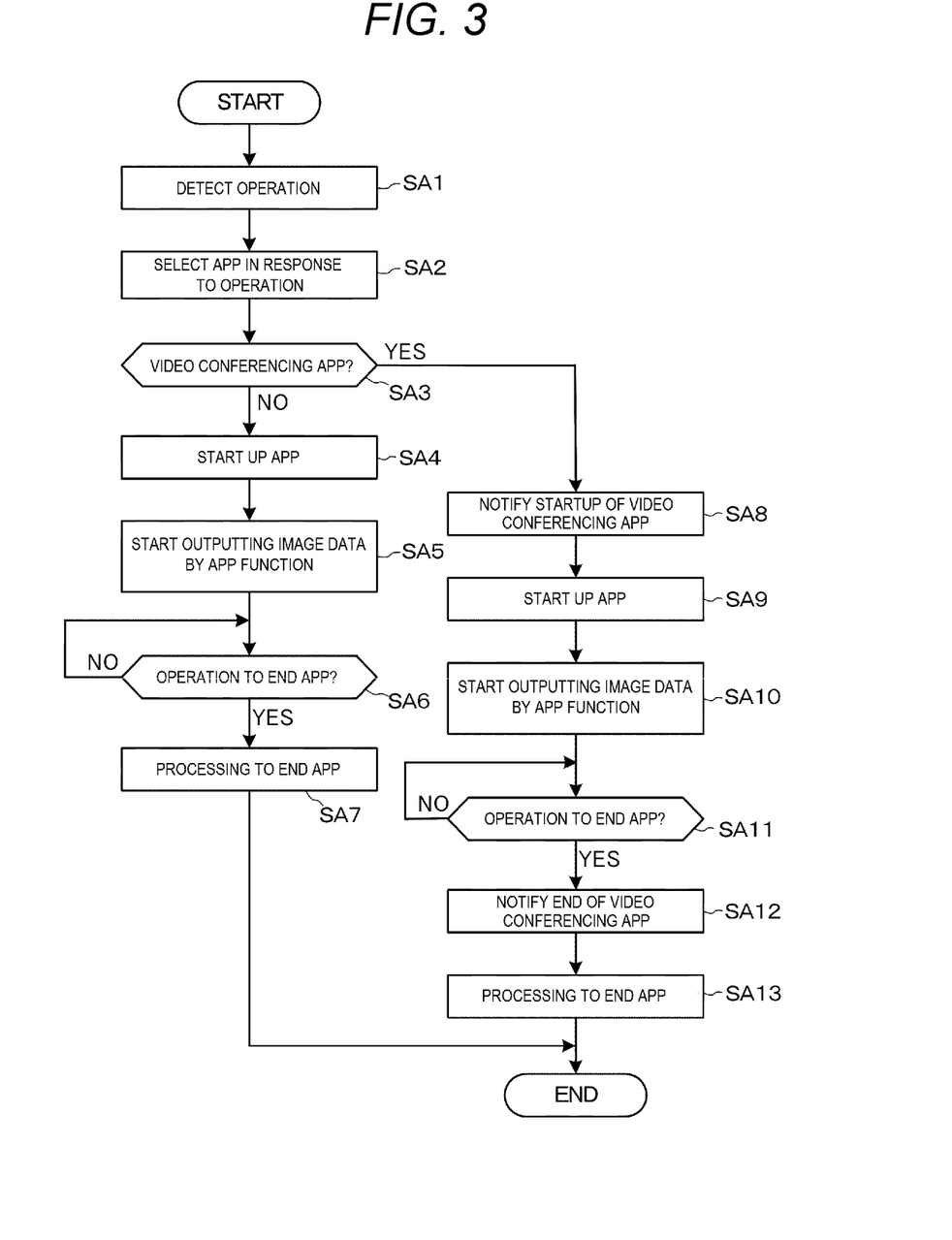
FIG. 3 is a flowchart showing an operation of a second control unit in a first embodiment.

FIG. 3 is a flowchart showing an operation of the projector 1 and shows an operation of the second control unit 15. The operation shown in FIG. 3 is performed in the state where the second operating system 151 is being executed during the operation of the projector 1.

The second operating system 151 detects an operation on the remote controller 75 (step SA1) and selects an application program designated by the operation (step SA2). The second operating system 151 determines whether the selected application program is the video conferencing app 152 or not (step SA3).

When the selected application program is not the video conferencing app 152 (NO in step SA3), the second operating system 151 starts up the selected application program (step SA4). The second operating system 151 start outputting image data by the function of the application program (step SA5).

During the execution of the application program, the second operating system 151 determines whether an operation of giving an instruction to end the application program by the remote controller 75 is performed or not (step SA6). This operation may be, for example, an operation of giving an instruction to end the execution of the application program or an operation of giving an instruction to start another application program. When no such operation is performed (NO in step SA6), the second operating system 151 repeats the determination of step SA6 every predetermined time period.

When the operation of giving the instruction to end the application program is performed (YES in step SA6), the second operating system 151 ends the application program that is currently being executed (step SA7). Subsequently, the second operating system 151 may return to step SA1.

When the selected application program is the video conferencing app 152 in step SA3 (YES in step SA3), the second operating system 151 notifies the startup of the video conferencing app 152 (step SA8). In step SA8, the second operating system 151, for example, generates control data notifying the start of a video conference and outputs the control data to the first interface unit 20. This enables the first control unit 10 to detect that the execution of the video conferencing app 152 is to be started, before the video conferencing app 152 outputs image data.

The control data transmitted in step SA8 may be data including one or more of the type of the application program started up on the second operating system 151, various set values relating to the operation of the projector 1, information designating the display setting data held by the first control unit 10, and the like, or may be data including a combination of a plurality of pieces of information, of these pieces of information. Also, in step SA8, the application program operating on the second operating system 151 may transmit control data to the first interface unit 20. The control data transmitted to the first interface unit 20 in step SA8 may be a command including the various kinds of information described above.

Subsequently, the second operating system 151 starts up the video conferencing app 152 (step SA9) and starts outputting image data by the function of the video conferencing app 152 (step SA10).

During the execution of the video conferencing app 152, the second operating system 151 determines whether an operation of giving an instruction to end the application program by the remote controller 75 is performed or not (step SA11). When no such operation is performed (NO in step SA11), the second operating system 151 repeats the determination of step SA11 every predetermined time period.

When the operation of giving the instruction to end the application program is performed (YES in step SA11), the second operating system 151 notifies the end of the video conferencing app 152 (step SA12). In step SA12, the second operating system 151, for example, generates control data notifying the end of the video conference and outputs the control data to the first interface unit 20. This enables the first control unit 10 to detect that the video conferencing app 152 ends. The second operating system 151 ends the video conferencing app 152 (step SA13). The second operating system 151 may simultaneously execute the operations of steps SA12 and SA13 or may execute these steps in the reverse order. Subsequently, the second operating system 151 may return to step SA1.

Figure 4:
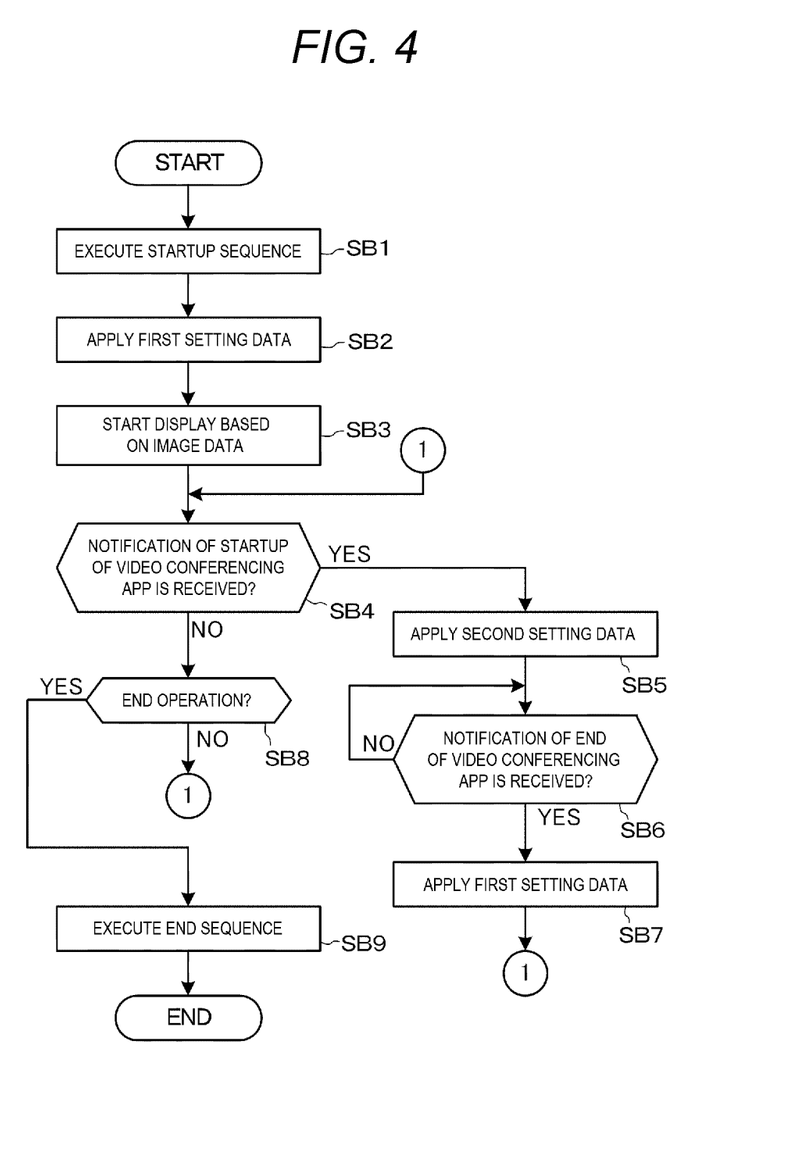
FIG. 4 is a flowchart showing an operation of a first control unit in the first embodiment.

FIG. 4 is a flowchart showing an operation of the projector 1 and shows an operation of the first control unit 10. The operation shown in FIG. 4 is started at the startup of the first control unit 10.

The first operating system 111 executes a startup sequence of the projector 1 (step SB1). In step SB1, the first operating system 111 performs, for example, the initialization of the projection unit 50 and a sensor, not illustrated, the setting of an initial value for the light source drive circuit 61, the light modulation device drive circuit 62, the image processing unit 63, the signal processing unit 65, and the input processing unit 71, or the like.

The display setting module 114 applies default display setting data to the image processing unit 63 (step SB2). For example, the default display setting data is the first display setting data 121.

The display control module 112 starts a display based on image data inputted to the first interface unit 20 (step SB3).

The display setting module 114 determines whether a notification of the startup of the video conferencing app 152 is received from the second control unit 15 or not (step SB4).

When the notification of the startup of the video conferencing app 152 is received (YES in step SB4), the display setting module 114 applies the second display setting data 122, which is the display setting data corresponding to the video conferencing app 152, to the image processing unit 63 (step SB5).

In step SB5, the display setting module 114 applies the display setting data, based on the control data transmitted from the second operating system 151 in step SA8. For example, in step SB5, the first control unit 10 may analyze the control data received from the second control unit 15 and read out and set the display setting data corresponding to the information included in the control data, from the first storage unit 12.

Subsequently, the display setting module 114 determines whether a notification of the end of the video conferencing app 152 is received from the second control unit 15 or not (step SB6). When the notification is not received (NO in step SB6), the display setting module 114 repeats the determination of step SB6 every predetermined time period.

When the notification of the end of the video conferencing app 152 is received (YES in step SB6), the display setting module 114 applies the display setting data that is applied before the second display setting data 122 is applied, to the image processing unit 63 (step SB7), and returns to step SB4. In the example shown in FIG. 4, the first display setting data 121 is applied before the second display setting data 122 is applied. Therefore, the display setting module 114 applies the first display setting data 121 to the image processing unit 63 in step SB7.

Meanwhile, when the notification of the startup of the video conferencing app 152 is not received (NO in step SB4), the display setting module 114 determines whether an instruction to end the operation of the projector 1 is given or not (step SB8). This instruction is implemented by control data inputted from the second control unit 15 based on an operation on the remote controller 75, or by an operation on the operation panel 72. When no such instruction is given (NO in step SB8), the first operating system 111 returns to step SB4. When the instruction to end the operation of the projector 1 is given (YES in step SB8), the first operating system 111 executes an end sequence (step SB9) and ends this processing.

2. Second Embodiment

A second embodiment of the present disclosure will now be described. The configuration of the projector 1 in the second embodiment is the same as in the first embodiment and therefore is not be illustrated or described further.

In the second embodiment, the second operating system 151 does not notify the startup and the end of the video conferencing app 152. That is, the operations of steps SA8 and SA12 shown in FIG. 3 are omitted from the operations of the second control unit 15. The other operations of the second control unit 15 than steps SA8 and SA12 are the same as in the first embodiment.

In the second embodiment, the first operating system 111 can detect that the second operating system 151 performs the processing to start up the video conferencing app 152 and the processing to end the video conferencing app 152. For example, the first operating system 111 performs processing to specify the type and name of an application program that is being executed by the second operating system 151, every predetermined time period.

Figure 5:
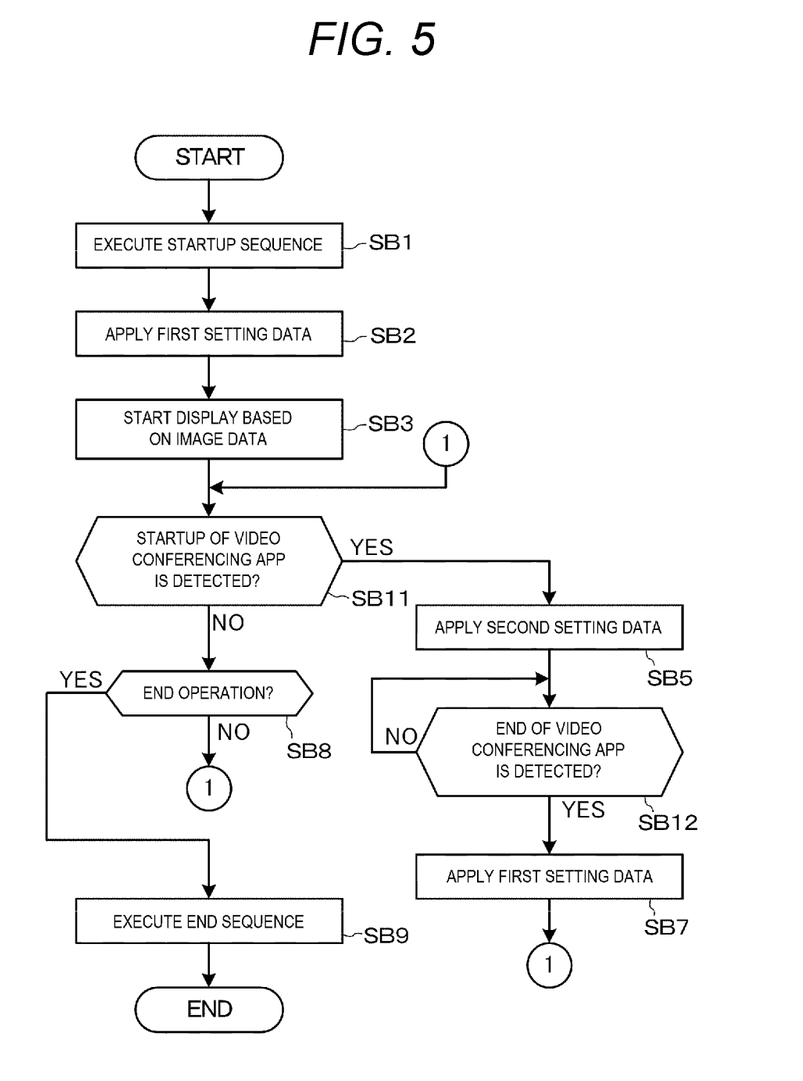
FIG. 5 is a flowchart showing an operation of a first control unit in a second embodiment.

FIG. 5 is a flowchart showing an operation of the projector 1 in the second embodiment and shows an operation of the first control unit 10. The operation shown in FIG. 5 is executed in place of the operation shown in FIG. 4. In the operation shown in FIG. 5, the same processing steps as in FIG. 4 are denoted by the same step numbers and are not described further in detail.

In step SB3, the display setting module 114 starts a display based on image data inputted to the first interface unit 20 and shifts to step SB11. In step SB11, the display setting module 114 determines whether the startup of the video conferencing app 152 by the second control unit 15 is detected or not (step SB11).

When the startup of the video conferencing app 152 is detected (YES in step SB4), the display setting module 114 shift to step SB5.

Subsequently, the display setting module 114 determines whether the end of the video conferencing app 152 by the second control unit 15 is detected or not (step SB12). When the end of the video conferencing app 152 is not detected (NO in step SB12), the display setting module 114 repeats the determination of step SB12 every predetermined time period.

When the end of the video conferencing app 152 is detected (YES in step SB12), the display setting module 114 shifts to step SB7.

Meanwhile, when the startup of the video conferencing app 152 is not detected (NO in step SB11), the display setting module 114 shifts to step SB8.

In the second embodiment, even in the configuration where the second control unit 15 does not give a notification of the startup of the video conferencing app 152 and a notification of the end of the video conferencing app 152, the first control unit 10 can apply the display setting data corresponding to the startup and the end of the video conferencing app 152.

3. Advantageous Effects of Embodiments

As described above, the projector 1 according to the present disclosure has the projection unit 50, the first control unit 10 causing the projection unit 50 to display an image based on display data, and the second control unit 15 executing an application program and outputting the display data. The first control unit 10 has a plurality of display setting data relating to the display state of an image. The first control unit 10 sets the display setting data corresponding to the application program, in response to the second control unit 15 starting up the application program. For example, the first control unit 10 has the first display setting data 121, the second display setting data 122, and the third display setting data 123, as the plurality of display setting data. The first control unit 10 sets the second display setting data 122 for the image processing unit 63 in response to the second control unit 15 starting up the video conferencing app 152.

The control method executed by the projector 1 includes: holding a plurality of display setting data relating to the display state of an image by the projection unit 50 in such a way that the plurality of display setting data are available for use by the first control unit 10; causing the first control unit 10 to execute display control to cause the projection unit 50 to display an image based on display data; causing the second control unit 15 to execute an application program and output the display data; and causing the first control unit 10 to set the display setting data corresponding to the application program in response to the second control unit 15 starting up the application program.

In the projector 1 and the control method for the projector 1, the display setting data in the first control unit is changed to the second display setting data 122 corresponding to the video conferencing app 152, in response to the second control unit 15 executing the video conferencing app 152. Thus, the display setting can be swiftly changed in response to a change of the application program executed by the second control unit 15, and the display setting of the projector 1 can be maintained in a proper state. Therefore, a high-definition image can be displayed in response to a change of the application program.

The display setting data available for use by the first control unit 10 includes the first display setting data 121 and the second display setting data 122. The projector 1 causes the first control unit 10 to set the first display setting data 121. The projector 1 causes the first control unit 10 to set the second display setting data 122 in response to the second control unit 15 starting up an application program. The projector 1 causes the first control unit 10 to set the first display setting data 121 in response to the execution of the application program by the second control unit 15 being ended.

Thus, in response to the video conferencing app 152 being ended, the display setting data can be returned to the state before the execution of the video conferencing app 152. Therefore, a high-definition image can be displayed in response to a change of the application program executed by the second control unit 15.

The projector 1 executes the first operating system 111 by the first processor provided in the first control unit 10 and executes the second operating system 151 by the second processor provided in the second control unit 15. The second control unit 15 executes an application program on the second operating system 151.

In this configuration, where the first control unit 10 and the second control unit 15 operate on different operating systems from each other, the first control unit 10 can change the display setting data in response to a change of the application program executed by the second control unit 15. This configuration enables efficient and separate execution of the application program and the display control by the projection unit 50. Even in the configuration where different operation systems are employed, the display setting data can be changed and a high-definition image can be displayed in response to a change of the application program.

In the example described in the first embodiment, the second control unit 15 gives a notification to the first control unit 10 when starting the execution of an application program. In response to the notification from the second control unit 15, the first control unit 10 sets the display setting data corresponding to the application program. In this example, the first control unit 10 can securely change the display setting data in response to the state of execution of the application program by the second control unit 15.

In the example described in the second embodiment, the projector 1 causes the first control unit 10 to detect the state of execution of an application program by the second control unit 15. In this example, even when the second control unit 15 does not have a communication function, the first control unit 10 can securely change the display setting data in response to the state of execution of the application program by the second control unit 15. Therefore, the projector 1 that can change the display setting data in response to the startup and the end of the video conferencing app 152, using the general-purpose second operating system 151, can be realized.

4. Other Embodiments

The foregoing embodiments are specific examples to which the present disclosure is applied. The present disclosure is not limited to these embodiments.

For example, in the first embodiment, the second control unit 15 is described as being configured to determine whether the application program selected in response to an operation on the remote controller 75 is the video conferencing app 152 or not. However, the present disclosure is not limited to this configuration. The second control unit 15 may be configured to determine whether an operation on the remote controller 75 is an operation of giving an instruction to start up the video conferencing app 152 or not. In the second embodiment, an example where the first control unit 10 is configured to detect the startup and the end of the video conferencing app 152 is described. However, the present disclosure is not limited to this configuration. For example, the first control unit 10 may be configured to detect an operation of giving an instruction to startup and end the video conferencing app 152.

Also, for example, in each of the foregoing embodiments, an example where the second control unit 15 built in the projector 1 is configured to execute the second operating system 151 and output display data to the first control unit 10 is described. However, the present disclosure is not limited to this configuration. For example, a device formed as a separate unit from the projector 1 may be configured to execute the second operating system 151 and the video conferencing app 152.

In each of the foregoing embodiments, an example where the display setting module 114 is configured to apply display setting data to the image processing unit 63 is described. However, the present disclosure is not limited to this configuration. The display setting module 114 may be configured to apply display setting data to and configure a setting for a processing unit that performs processing for an image displayed by the projection unit 50. For example, when the display setting data includes data relating to a display setting in the projection unit 50, the display setting module 114 may set the display setting data for the projection unit 50 or may set the display setting data for both the image processing unit 63 and the projection unit 50.

Also, for example, in each of the foregoing embodiments, the projector 1 is described as an example of the display device. However, the display device to which the present disclosure is applied is not limited to the projector 1. For example, the display device may be a liquid crystal display that displays an image on a liquid crystal display panel. Also, a display device that displays an image on a plasma display panel or an organic EL (electroluminescence) panel may be employed. In such cases, the liquid crystal display panel, the plasma display panel, and the organic EL panel are equivalent to an example of the display unit.

Also, the program executed by the first processor 11 may be not stored in the first storage unit 12 and may be stored in another storage device, a storage medium, or a storage medium of an external device, and may be read out and executed by the first processor 11.

Each of the functional units shown in FIGS. 1 and 2 represents a functional configuration and is not limited to any particular installation form. For example, pieces of hardware corresponding to individual functional units need not necessarily be installed. A single processor may execute a program to implement functions of a plurality of functional units. Also, in the embodiments, a part of the functions implemented by software may be implemented by hardware, and a part of the functions implemented by hardware may be implemented by software. Moreover, the specific details of the configuration of each of the other parts of the projector 1 can be arbitrarily changed without departing from the spirit and scope of the present disclosure.

The processing steps in the flowcharts shown in FIGS. 3, 4, and 5 are provided by dividing the processing according to the main processing content in order to facilitate understanding of the processing by the projector 1. The present disclosure is not limited by the way the processing is divided into processing steps and the names of the steps shown in the flowcharts. The processing by the projector 1 can be divided into further processing steps according to the processing content and can be divided in such a way that one processing step includes further processing steps. The processing orders in the flowcharts are not limited to the illustrated examples, either.

What is claimed is:

1. A control method for a projector including a projection unit that is configured to display an image on a screen, a first control unit, and a second control unit, the control method comprising:

holding a plurality of display setting data relating to a display state of the image by the projection unit in such a way that the plurality of display setting data are available for use by the first control unit;

causing the first control unit to execute display control to cause the projection unit to display an image based on display data;

causing the second control unit to execute an application program and output the display data; and causing the first control unit to set one of the plurality of display setting data corresponding to the application program in response to the second control unit starting up the application program, wherein:

the projector is configured to display the image on the screen, each display setting data of the plurality of display setting data includes parameters set for image processing in order to display an image according to a particular application program on the screen by the projector, a first application program is for a theater application and a second application program is for a video conferencing application, a first display setting data of the plurality of display setting data includes a first audio setting for audio and a first video setting for video that is used by the projector with the theater application, and a second display setting data of the plurality of display setting data includes a second audio setting for audio and a second video setting for video that is used by the projector with the video conferencing application, the first and second audio settings being different setting levels and the first and second video settings being different setting levels.

2. The control method for the projector according to claim 1, wherein the first control unit sets the first display setting data, the first control unit sets the second display setting data in response to the second control unit starting up the application program, and the first control unit sets the first display setting data in response to the second control unit ending the execution of the application program.

3. The control method for the projector according to claim 1, wherein the first control unit detects a state of execution of the application program by the second control unit.

4. The control method for the projector according to claim 1, wherein the second control unit gives a notification to the first control unit when starting the execution of the application program, and the first control unit sets the display setting data corresponding to the application program in response to the notification from the second control unit.

5. The control method for the projector according to claim 1, wherein a first operating system is executed by a first processor provided in the first control unit, and a second operating system is executed by a second processor provided in the second control unit and the application program is executed on the second operating system.

6. The control method for the projector according to claim 1, wherein a third application program is for a presentation application, and a third display setting data of the plurality of display setting data including a third audio setting for audio and a third video setting for video that is used by the projector with the presentation application, the first, second and third audio settings being different setting levels and the first, second and third video settings being different setting levels.

7. A projector comprising:

a projection unit that is configured to display an image on a screen;

a first control unit causing the projection unit to display the image based on display data; and a second control unit executing an application program and outputting the display data, the first control unit having a plurality of display setting data relating to a display state of the image, the first control unit setting one of the plurality of display setting data corresponding to the application program in response to the second control unit starting up the application program, the projection unit being configured to display the image on the screen, each display setting data of the plurality of display setting data includes parameters set for image processing in order to display an image according to a particular application program on the screen by the projection unit, a first application program being for a theater application and a second application program being for a video conferencing application, a first display setting data of the plurality of display setting data including a first audio setting for audio and a first video setting for video that is used by the projector with the theater application, and a second display setting data of the plurality of display setting data including a second audio setting for audio and a second video setting for video that is used by the projector with the video conferencing application, the first and second audio settings being different setting levels and the first and second video settings being different setting levels.

8. A control method for a projector including a projection unit that is configured to display an image on a screen, a first control unit, and a second control unit, the control method comprising:

holding a plurality of display setting data relating to a display state of an image by the projection unit in such a way that the plurality of display setting data are available for use by the first control unit;

causing the first control unit to execute display control to cause the projection unit to display the image based on display data;

causing the second control unit to execute an application program and output the display data; and causing the first control unit to set one of the plurality of display setting data corresponding to the application program in response to the second control unit starting up the application program, wherein:

the projector is configured to display the image on the screen, a first application program is for a theater application and the second application program is for a video conferencing application, a first display setting data of the plurality of display setting data includes a first audio setting for audio and a first video setting for video that is used by the projector with the theater application, and a second display setting data of the plurality of display setting data includes a second audio setting for audio and a second video setting for video that is used by the projector with the video conferencing application, the first and second audio settings being different setting levels and the first and second video settings being different setting levels.

* * * * *